(12) United States Patent
Kono (10) Patent No.: US 11,716,004 B2
(45) Date of Patent: Aug. 1, 2023

(54) VIBRATION OUTPUT APPARATUS

(71) Applicant: CLARION CO., LTD., Saitama (JP)

(72) Inventor: Kenji Kono, Saitama (JP)

(73) Assignee: CLARION CO., LTD., Saitama (JP)

(*) Notice: Subject to any disclaimer, the term of this patent is extended or adjusted under 35 U.S.C. 154(b) by 343 days.

(21) Appl. No.: 17/005,319

(22) Filed: Aug. 28, 2020

(65) Prior Publication Data

US 2021/0067024 A1   Mar. 4, 2021

(30) Foreign Application Priority Data

Aug. 29, 2019 (JP) .................. 2019-156877

(51) Int. Cl.
*H04R 7/04* (2006.01)
*H04R 7/26* (2006.01)
(Continued)

(52) U.S. Cl.
CPC .............. *H02K 33/18* (2013.01); *H02K 9/22* (2013.01); *H04R 7/26* (2013.01); *H04R 9/046* (2013.01);
(Continued)

(58) Field of Classification Search
CPC . H04R 7/26; H04R 7/04; H04R 7/045; H04R 9/046; H04R 9/06; H04R 9/18; H04R 2400/03; H04R 2400/11; H04R 1/025; H04R 1/2869; H04R 1/2876; H04R 1/2896; H04R 1/2892; B60R 11/0223
See application file for complete search history.

(56) References Cited

U.S. PATENT DOCUMENTS 6,397,972 B1 * 6/2002 Bank ..................... H04R 7/045
84/157
11,115,740 B2 * 9/2021 Masuda ................. H04R 1/025
(Continued)

FOREIGN PATENT DOCUMENTS

CN     1525787     9/2004
CN     101007305   8/2007
(Continued)

OTHER PUBLICATIONS

Chinese Office Action for corresponding CN Application No. 202010811545.6, dated Aug. 24, 2021.
(Continued)

*Primary Examiner* — Edgardo San Martin
(74) *Attorney, Agent, or Firm* — Mori & Ward, LLP (57) ABSTRACT

A vibration output apparatus (1) includes a vibration transmission member (20), an acoustic vibration output unit (10), and a cushion (30). The vibration transmission member (20) is formed by integrating a body plate (21) and a support portion (22). The support portion (22) is in contact with a vibration plate (100) and supports the body plate (21). The body plate (21) has an opposite surface (21a) opposite to a vibration surface (100u) of the vibration plate (100) and forms an opposite space (S1) between the vibration surface (100u) and the opposite surface (21a). The acoustic vibration output unit (10) is disposed on a rear surface (21b) of the opposite surface (21a) of the body plate (21) and is configured to output an acoustic vibration. The support portion (22, 23) is not in contact with the cushion (30).

20 Claims, 10 Drawing Sheets

(51) Int. Cl.
*H04R 9/18* (2006.01)
*H04R 1/02* (2006.01)
*B60R 11/00* (2006.01)
*H02K 33/18* (2006.01)
*H02K 9/22* (2006.01)
*H04R 9/04* (2006.01)
*H04R 9/06* (2006.01)

(52) U.S. Cl.
CPC ........... *H04R 9/06* (2013.01); *H04R 2400/03* (2013.01); *H04R 2400/11* (2013.01)

(56) References Cited

U.S. PATENT DOCUMENTS

| | | |
|---|---|---|
| 2004/0163883 A1 | 8/2004 | Suzuki |
| 2007/0164616 A1 | 7/2007 | Kuwabara et al. |
| 2012/0114150 A1 | 5/2012 | Suzuki et al. |
| 2012/0263338 A1 | 10/2012 | Hori et al. |
| 2021/0268544 A1* | 9/2021 | Murase .................. H04R 19/02 |
| 2021/0409868 A1* | 12/2021 | Yokohama ............... H04R 7/04 |

FOREIGN PATENT DOCUMENTS

| | | | | |
|---|---|---|---|---|
| CN | 102469388 | | 5/2012 | |
| CN | 102726063 | | 10/2012 | |
| CN | 108243377 A | * | 7/2018 | ............... H04R 9/02 |
| CN | 108282722 A | * | 7/2018 | ............ H04R 1/222 |
| EP | 0847661 | | 6/1998 | |
| EP | 3096538 | | 11/2016 | |
| JP | 2002199480 A | * | 7/2002 | ............ H04R 13/00 |
| JP | 5612498 B2 | | 8/2012 | |
| KR | 20210093083 A | * | 7/2021 | ............... H04R 7/26 |
| WO | WO-0223946 A2 | * | 3/2002 | ............ H04R 7/045 |
| WO | WO 2008/048625 | | 4/2008 | |
| WO | WO-2018070399 A1 | * | 4/2018 | ............... H04R 1/02 |

OTHER PUBLICATIONS

Extended European Search Report for corresponding EP Application No. 20192720.9-1009, dated Feb. 5, 2021.

* cited by examiner

VIBRATION OUTPUT APPARATUS

CROSS-REFERENCE TO RELATED APPLICATIONS

The present application claims priority to Japanese Patent Application JP 2019-156877 filed in the Japan Patent Office on Aug. 29, 2019, the entire content of which is hereby incorporated by reference.

BACKGROUND OF THE INVENTION

Field of the Invention

The present invention relates to a vibration output apparatus.

Description of Related Art

Figure 10A:
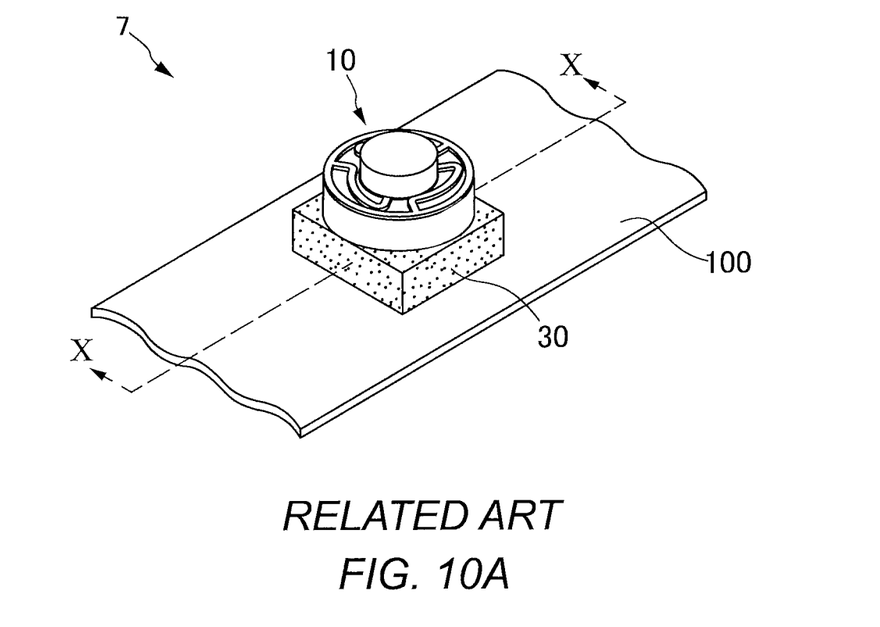
FIG. 10A is a perspective view showing a conventional vibration output apparatus.
Figure 10B:
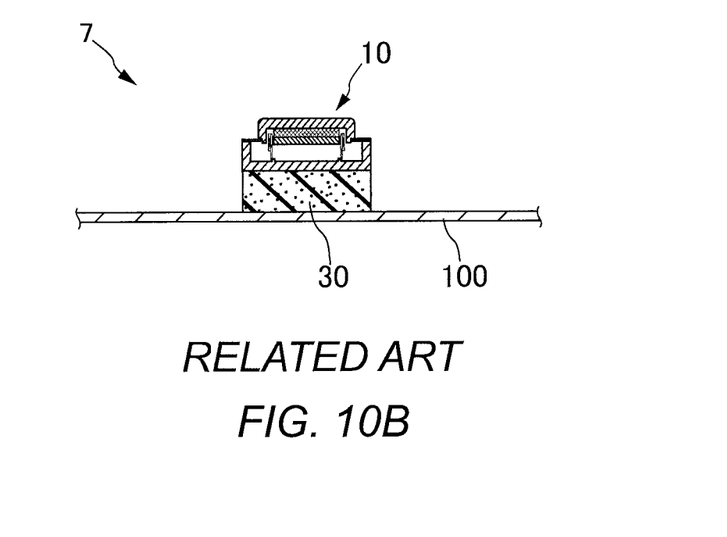
FIG. 10B is a sectional view of the vibration output apparatus taken along cut line X-X in FIG. 10A.

There have been known vibration output apparatuses that transmit a vibration to the interior material or frame of the vehicle so that the interior material or the like outputs a low-frequency acoustic vibration. Such vibration output apparatuses are disclosed in, for example, Japanese Patent No. 5612498 and the like. FIG. 10A is a schematic perspective view showing an example vibration output apparatus, and FIG. 10B is a sectional view of the vibration output apparatus taken along cut line X-X in FIG. 10A. In a vibration output apparatus 7, an exciter 10 is mounted to a vibration plate 100, such as an interior material, through a cushion 30. This configuration allows the cushion 30 to absorb (reduce) unwanted frequency components of an acoustic vibration outputted from the exciter 10 so that the vibration plate 100 outputs a good-quality low-frequency acoustic vibration.

In the vibration output apparatus 7, in order to the vibration plate 100 outputs a low-frequency vibration, the cushion 30 is preferably not only able to transmit the acoustic vibration from the exciter 10 to the vibration plate 100 but also is formed of a relatively soft material.

However, in the case of the vibration output apparatus 7, the exciter 10 is mounted to the vibration plate 100 through the cushion 30. If the cushion 30 is formed of a soft material, it is difficult to ensure sufficient strength to hold the exciter 10. Insufficient strength may result in a drop of the exciter 10 from the cushion 30. Even if the cushion 30 has sufficient strength when mounted, the cushion 30 may fail to sufficiently hold the exciter 10 as it degrades over time.

On the other hand, if the cushion 30 is formed of a relatively hard material so as to sufficiently hold the exciter 10, it would not be easy to output a good-quality low-frequency vibration.

The present invention has been made in view of the foregoing, and an object thereof is to provide a vibration output apparatus in which an acoustic vibration output unit mounted to a vibration plate is not affected by a cushion.

SUMMARY OF THE INVENTION

A vibration output apparatus according to one aspect of the present invention includes a vibration transmission member formed by integrating a body plate and a support portion, the body plate having an opposite surface opposite to a vibration surface of a vibration plate and forming an opposite space between the vibration surface and the opposite surface, the support portion being in contact with the vibration plate and supporting the body plate, an acoustic vibration output unit disposed on a rear surface of the opposite surface of the body plate and configured to output an acoustic vibration, and a cushion disposed in the opposite space so as to be in contact with the vibration surface and the opposite surface. The support portion is not in contact with the cushion.

In the vibration transmission member of the vibration output apparatus according to an embodiment of the present invention, the body plate and the support portion are integrally formed. The body plate has the opposite surface opposite to the vibration surface of the vibration plate and forms the opposite space between the vibration surface and the opposite surface. The support portion is in contact with the vibration plate and supports the body plate. The cushion is disposed in the opposite space, and the acoustic vibration output unit is disposed on the rear surface of the opposite surface of the body plate. That is, the body plate and the support portion of the vibration transmission member support the acoustic vibration output unit. Accordingly, the acoustic vibration output unit does not have to be directly supported by the cushion.

Thus, even if the cushion is formed of a soft material to increase the elasticity thereof, there is no risk that the acoustic vibration output unit will drop. Also, even if the elasticity or shape of the cushion is changed as the cushion degrades over time, there is no risk that the acoustic vibration output unit will drop. That is, the acoustic vibration output unit mounted to the vibration plate is not affected by the elastic state, temporal degradation, or the like of the cushion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Now, vibration output apparatuses according to embodiments of the present invention will be described in detail with reference to the drawings.

First Embodiment

Figure 1A:
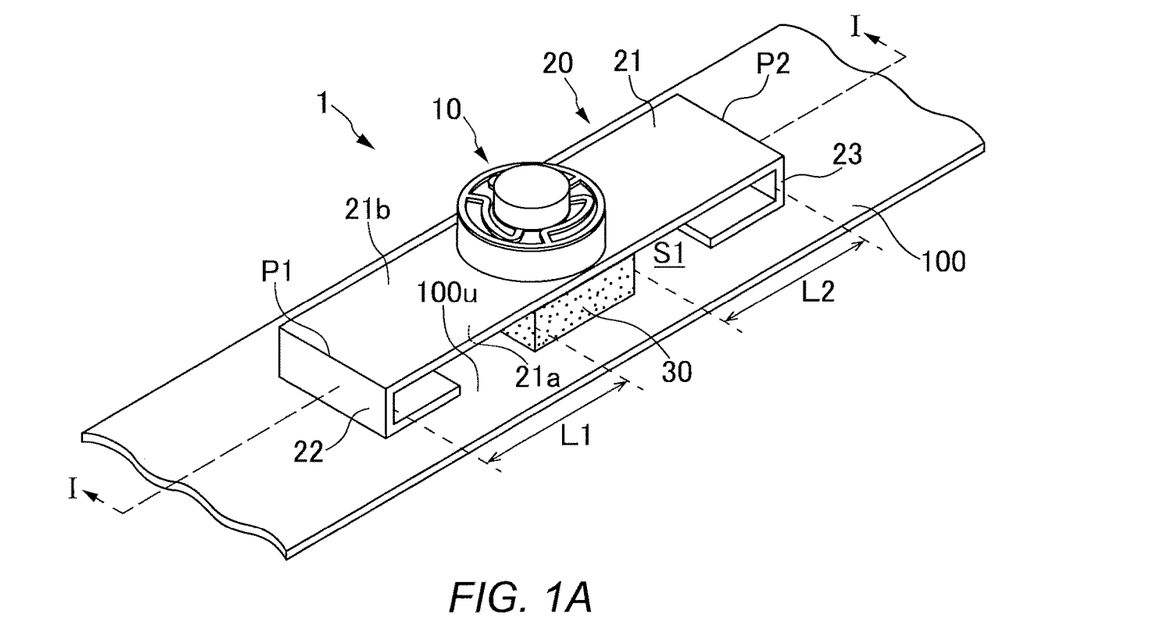
FIG. 1A is a perspective view showing a vibration output apparatus according to a first embodiment.
Figure 1B:
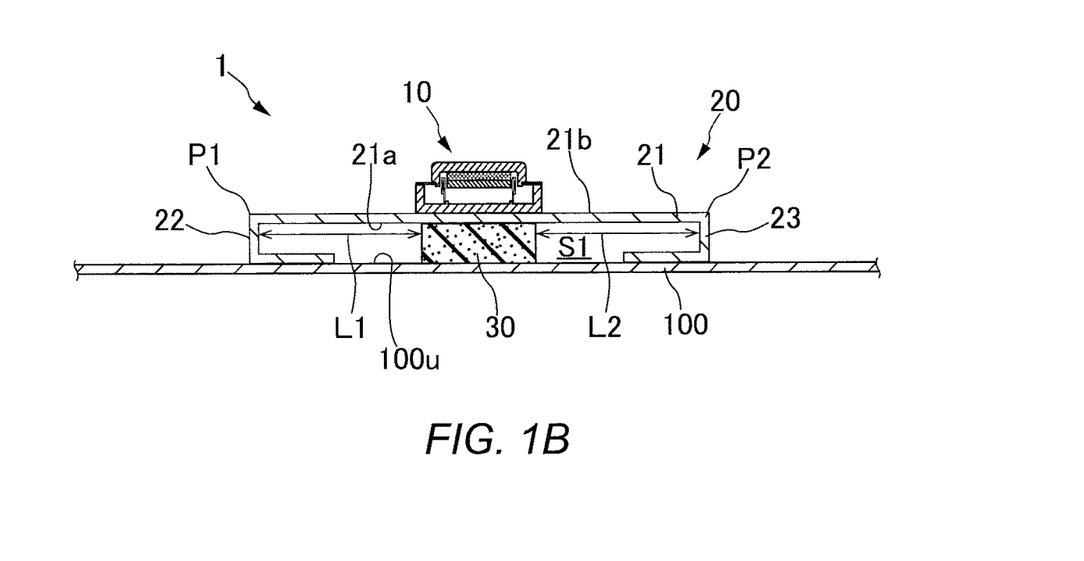
FIG. 1B is a sectional view of the vibration output apparatus taken along cut line I-I in FIG. 1A.

FIG. 1A is a perspective view showing a schematic configuration of a vibration output apparatus according to a first embodiment. FIG. 1B is a sectional view of the vibration output apparatus taken along cut line I-I in FIG. 1A. A vibration output apparatus 1 includes an exciter (acoustic vibration output unit) 10, a vibration transmission member 20, and a cushion (cushion) 30. The vibration output apparatus 1 is mounted on a vibration plate 100.

Figure 2:
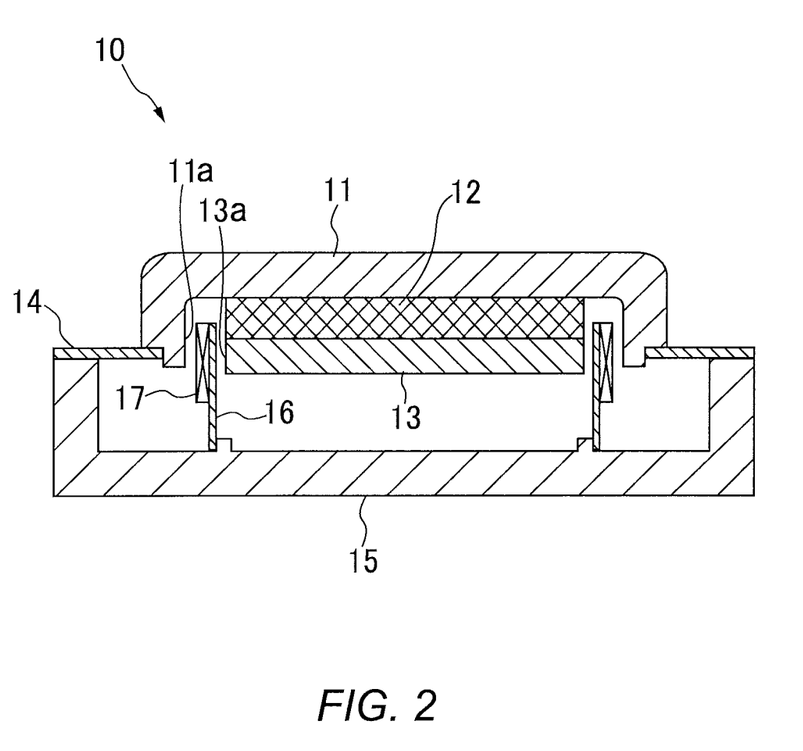
FIG. 2 is a sectional view of an exciter taken along cut line I-I in FIG. 1A.

As shown in FIG. 2, in the exciter 10, a permanent magnet 12 and an inside yoke 13 are stacked in an outside yoke 11 having a reverse concave cross-section. The outside yoke 11 is mounted to a frame 15 through a damper 14. A first end of a voice coil bobbin 16 is fixed to the frame 15. A voice coil 17 is mounted on a second end of the voice coil bobbin 16. The second end of the voice coil bobbin 16 extends to a clearance between the inner circumferential wall 11a of the outside yoke 11 and the outer circumferential wall 13a of the inside yoke 13 and permanent magnet 12. The voice coil 17 is located in this clearance. When an acoustic signal is inputted to the voice coil 17 of the exciter 10, a Lorentz force (a force based on the Fleming's left-hand rule) is applied to the outside yoke 11, inside yoke 13, and permanent magnet 12 due to current flowing through the voice coil 17 and a magnetic field generated by the permanent magnet 12. Thus, the outside yoke 11, inside yoke 13, and permanent magnet 12 reciprocate so as to approach and leave the frame 15 through the damper 14. This reciprocation generates an acoustic vibration on the frame 15.

The vibration transmission member 20 is formed of a tabular elastic metal piece (elastic material). As shown in FIG. 1B, the vibration transmission member 20 is formed by bending both ends of the metal piece inwardly at a right angle twice. The ends of the vibration transmission member 20 have an L-shaped cross-section or an inverted L-shaped cross-section. Hereafter, an L-shaped cross-sectional first end of the vibration transmission member 20 is referred to as the "first support portion 22," and an inverted L-shaped cross-sectional second end of the vibration transmission member 20 is referred to as the "second support portion 23." Also, a flat portion from the upper end P1 of the first support portion 22 to the upper end P2 of the second support portion 23 of the vibration transmission member 20 is referred to as the "body plate 21."

The bottoms of the first support portion 22 and second support portion 23 are fixed to the vibration plate 100 using an adhesive. As shown in FIGS. 1A and 1B, the ends of the vibration transmission member 20 are formed by bending the vibration transmission member 20 at the upper end P1 of the first support portion 22 and the upper end P2 of the second support portion 23. Thus, a space S1 (opposite space) is formed between the lower surface (opposite surface) 21a of the body plate 21 and the upper surface (vibration surface) 100u of the vibration plate 100 so as to correspond to the height dimensions of the first support portion 22 and second support portion 23.

The cushion 30 is disposed in the space S1 so as to be in contact with both the lower surface 21a of the body plate 21 and the upper surface 100u of the vibration plate 100. Specifically, an adhesive is applied to at least one of the surfaces of the cushion 30 to be brought into contact with the lower surface 21a and upper surface 100u, and the cushion 30 is mounted on the vibration transmission member 20 and vibration plate 100 using the adhesive so as not to easily move.

The cushion 30 is in contact with both the lower surface 21a of the body plate 21 and the upper surface 100u of the vibration plate 100. For this reason, the height dimension of the cushion 30 is determined on the basis of the vertical height of the space S1. Specifically, the height dimension of the cushion 30 is determined on the basis of the vertical height of the space S1 in a state in which the exciter 10 disposed on the vibration transmission member 20 is outputting no vibration.

The cushion 30 is disposed in an intermediate position between the first support portion 22 and second support portion 23. As shown in FIGS. 1A and 1B, the width dimension of the cushion 30 (the dimension in the length direction of the body plate 21) is shorter than the distance from the first support portion 22 to the second support portion 23. Thus, a clearance L1 (a heat dissipation space) is secured between the cushion 30 and first support portion 22, and a clearance L2 (a heat dissipation space) is secured between the cushion 30 and second support portion 23. Accordingly, the cushion 30 is not in contact with the first support portion 22 or second support portion 23.

The cushion 30 absorbs vibrations having unwanted frequency components transmitted between the exciter 10 and vibration plate 100. The cushion 30 is formed of an elastic material. Changing the hardness or shape of the material of the cushion 30 allows for controlling frequency components absorbed by the cushion 30 and thus controlling the frequency range of acoustic vibrations (the frequency range of sounds) outputted or played back by the vibration plate 100, or the quality of the vibrations. For example, the cushion 30 may be formed of a rubber material or the like whose desired hardness is easily selected and which is easily formed into a desired shape.

Figure 3:
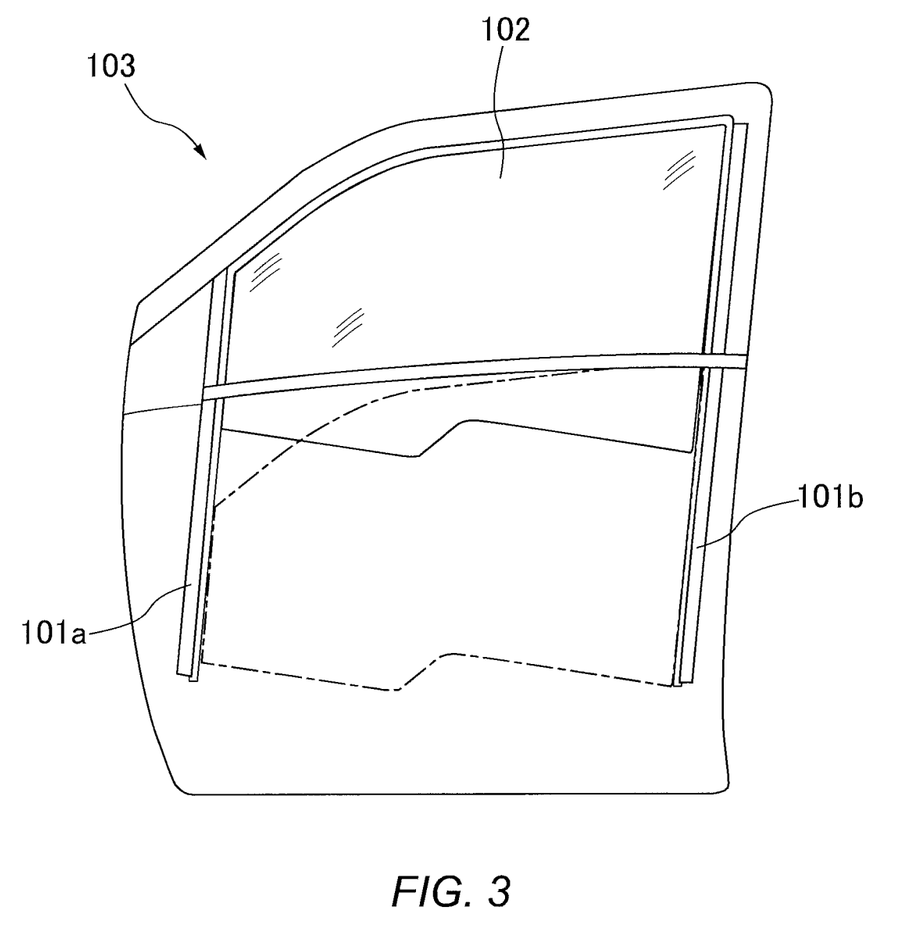
FIG. 3 is a drawing showing a schematic configuration of a vehicle door according to the first embodiment.

The vibration plate 100 is preferably a face material, such as an interior material, that is able to transmit a vibration transmitted from the vibration output apparatus 1 to the interior space, or a frame material or the like mounted on a face material. FIG. 3 is a drawing showing a schematic configuration of a vehicle door. If the vibration output apparatus 1 is mounted on a vehicle, glass guides 101a and 101b of a vehicle door 103, for example, may be used as the vibration plate 100.

The glass guides 101a and 101b are guide members that support the window glass 102 of the vehicle door 103. The glass guide 101a is disposed on the front side of the vehicle door 103, and the glass guide 101b is disposed on the rear side thereof. The glass guides 101a and 101b have a function of supporting the window glass 102 in the front-rear direction, as well as a function of guiding vertical movement of the window glass 102. The glass guides 101a and 101b are formed of single materials that have high strength so as to support and guide the window glass 102. It is preferred to use a single material(s) that has high strength and is as large as possible, as the vibration plate 100.

Since the glass guides 101a and 101b are members that support and guide the window glass 102, the glass guides 101a and 101b are able to transmit inputted acoustic vibrations to the glass surface during closing of the window glass 102 so that the entire glass surface propagate the acoustic vibrations in the vehicle. Thus, a good-quality acoustic environment is provided to the user in the vehicle.

Only the glass guides 101a and 101b are not vehicle interior materials available as the vibration plate 100. The vibration plate 100 may be the inner door panel, windshield, rear glass, door trim, headliner, or the like. Also, the vibration output apparatus 1 may be disposed in a place other than a vehicle. The indoor wall, ceiling surface, or the like may be used as the vibration plate 100 to provide an acoustic environment to the user.

The exciter 10 is disposed on the upper surface (rear surface) 21b of the body plate 21 so as to be located just above the cushion 30. The exciter 10 is disposed on the central portion of the body plate 21 with the lower surface of the frame 15 and the upper surface 21b of the body plate 21 adhering to each other through an adhesive.

When an acoustic signal is inputted to the voice coil 17 of the exciter 10, the outside yoke 11, inside yoke 13, and permanent magnet 12 reciprocate integrally through the damper 14, generating an acoustic vibration on the frame 15.

The acoustic vibration generated on the frame 15 is transmitted to the body plate 21 of the vibration transmission member 20 in contact with the frame 15. The body plate 21 is formed of an elastic metal piece, and the exciter 10 is located on the central portion of the body plate 21. Thus, the central portion of the body plate 21 is curved (deformed) into an arc shape using the upper ends P1 and P2 of the first support portion 22 and second support portion 23 as points of support. That is, the central portion of the body plate 21 is curved (deformed) alternately in the direction of the upper surface 21b and the direction of the lower surface 21a of the body plate 21. Thus, the central portion of the body plate 21 vibrates in an arc shape, that is, moves vertically. During the vertical movement (the vibration in the arc shape) of the body plate 21, the central portion of the body plate 21 serves as the antinode of the vibration, and the upper ends P1 and P2 of the first support portion 22 and second support portion 23 serve as the nodes of the vibration.

The acoustic vibration transmitted to the body plate 21 is increased in level by the vertical movement of the body plate 21 and transmitted to the cushion 30 in contact with the lower surface 21a of the central portion of the body plate 21. Since the cushion 30 is disposed in an intermediate position between the first support portion 22 and second support portion 23, it contacts a portion serving as the antinode of the vibration of the lower surface 21a of the body plate 21. The cushion 30 absorbs (eliminates) unwanted frequency components of the acoustic vibration transmitted through the surface thereof in contact with the lower surface 21a.

The cushion 30 absorbs not only the frequency components of the acoustic vibration transmitted from the exciter 10 to the vibration plate 100 but also frequency components of a vibration returned from the vibration plate 100 to the exciter 10.

Human ears have characteristics in which they tend to have difficulty in hearing a low-frequency sound compared to a high-frequency sound. For this reason, when sounds or vibrations based on acoustic signals inputted to the exciter 10 are transmitted to the vibration plate 100 through the vibration transmission member 20, sounds or acoustic vibrations having low-frequency components are masked by mid- to high-frequency sounds and thus become less perceptible.

Also, the vibration plate 100 vibrated by the acoustic vibrations of the exciter 10 returns reactions to the exciter 10. Thus, the exciter 10 outputs acoustic vibrations having an amplitude equal to or greater than that which the exciter 10 itself can vibrate. As a result, the vibration plate 100 may output vibrations that cause a great feeling of distortion.

The cushion 30 according to the first embodiment is disposed between the lower surface 21a of the vibration transmission member 20 having the exciter 10 mounted thereon and the upper surface 100u of the vibration plate 100 so as to be in contact with both surfaces. Thus, the cushion 30 absorbs and reduces sounds and vibrations having frequency components (vibration components) other than low-frequency components to be transmitted from the exciter 10 to the vibration plate 100.

An acoustic vibration having low-frequency components outputted from the exciter 10 is transmitted to the cushion 30 through the vibration transmission member 20. The cushion 30 extends the time from the occurrence to the end of the vibration by the elasticity thereof. This means that the amplitude interval (wavelength) of the vibration in a case in which the exciter 10 transmits the vibration to the vibration plate 100 through the vibration transmission member 20 and the cushion 30 is longer than that in a case in which the exciter 10 directly mounted on the vibration plate 100 transmits the vibration to the vibration plate 100. Thus, it allows the user to perceive deep, spacious, and extended bass based on the acoustic vibration (low-frequency vibration) outputted (amplified) by the vibration plate 100.

Since the cushion 30 is disposed on the vibration plate 100, it is able to reduce vibrations (reaction vibrations) to be returned from the vibration plate 100 to the exciter 10 and thus to suppress the influence of reaction vibrations on acoustic vibrations outputted from the exciter 10. Thus, the exciter 10 is able to output linear acoustic vibrations corresponding to inputted acoustic signals and to transmit such acoustic vibrations to the vibration plate 100.

The exciter 10 mounted on the vibration transmission member 20 is supported by the body plate 21, first support portion 22, and second support portion 23 of the vibration transmission member 20 and thereby fixed to the vibration plate 100. For this reason, the exciter 10 does not have to be supported by the cushion 30. Thus, even if the cushion 30 is formed of a soft material, there is no risk that the exciter 10 will drop from the vibration output apparatus 1. Also even if the elasticity or shape of the cushion 30 is changed as it degrades over time, there is no risk that the exciter 10 will drop.

While the cushion 30 is in contact with the body plate 21 of the vibration transmission member 20 and the vibration plate 100, it is not in contact with the first support portion 22 or second support portion 23. The clearance L1 and clearance L2 are formed between the cushion 30 and first support portion 22 and between the cushion 30 and second support portion 23, respectively. The clearances L1 and L2 prevent the acoustic vibration transmitted to the cushion 30 from being transmitted to the first support portion 22 or second support portion 23. Accordingly, there is no risk that acoustic vibration transmission characteristics of the cushion 30 will be affected by the first support portion 22 or second support portion 23.

If at least the body plate 21 of the vibration transmission member 20 is formed of a material having excellent heat dissipation performance, heat generated by reciprocation (approaching-leaving movement) of the exciter 10 is dissipated through the body plate 21. Specifically, portions other than a portion having the exciter 10 mounted thereon of the upper surface 21b of the body plate 21 serves as a heat dissipation surface. Also, the space S1 is formed on the lower surface 21a of the body plate 21, the clearance L1 is formed between the cushion 30 and first support portion 22, and the clearance L2 is formed between the cushion 30 and second support portion 23. By using the space S1, clearance L1, and clearance L2 as heat dissipation spaces, the lower surface 21a of the body plate 21 effectively serves as a heat dissipation surface.

The body plate 21 of the vibration transmission member 20 is formed integrally with the first support portion 22 and second support portion 23. For this reason, if the first support portion 22 and second support portion 23 are formed of a material having excellent heat dissipation performance, the heat dissipation characteristics of the vibration output apparatus 1 is further improved. Also, the clearance L1 between the cushion 30 and first support portion 22 and the clearance L2 between the cushion 30 and second support portion 23 is more effectively utilized as heat dissipation spaces through which heat dissipated from the first support portion 22 and second support portion 23 escapes into the atmosphere.

Figure 4A:
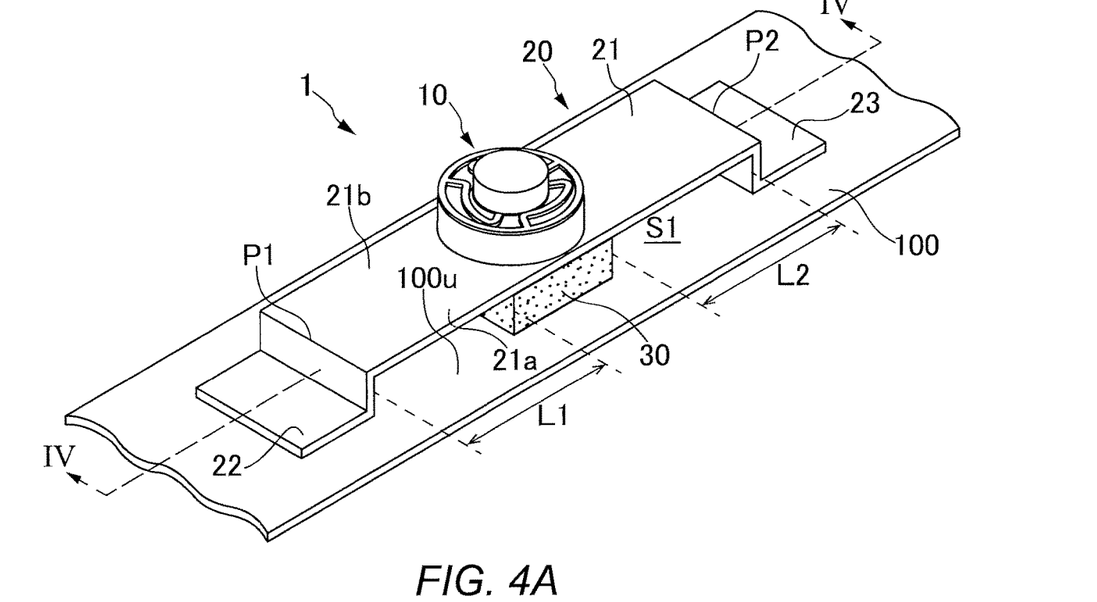
FIG. 4A is a perspective view showing the configuration of a vibration output apparatus according to a modification of the first embodiment.
Figure 4B:
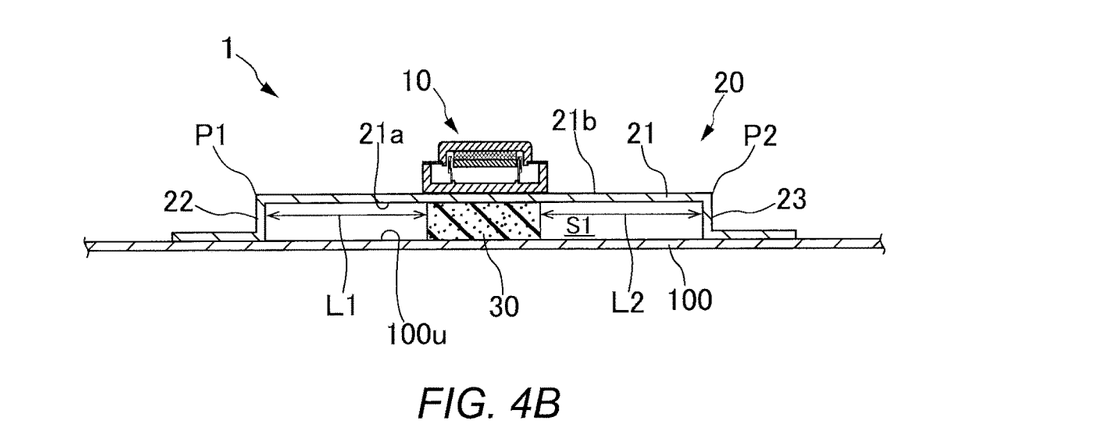
FIG. 4B is a sectional view of the vibration output apparatus taken along cut line IV-IV in FIG. 4A.

In the vibration output apparatus 1 shown in FIGS. 1A and 1B, the first support portion 22 and second support portion 23 of the vibration transmission member 20 have inwardly bent ends (portions in contact with the vibration plate 100). However, in a vibration output apparatus according to a modification, a first support portion 22 and a second support portion 23 of a vibration transmission member 20 may have otherwise shaped ends (contact portions). For example, as shown in FIGS. 4A and 4B, the first support portion 22 and second support portion 23 of the vibration transmission member 20 may have outwardly bent ends. Also, one of the first support portion 22 and second support portion 23 may have an outwardly bent end (contact portion), and the other support portion may have an inwardly bent (contact portion).

Second Embodiment

Figure 5A:
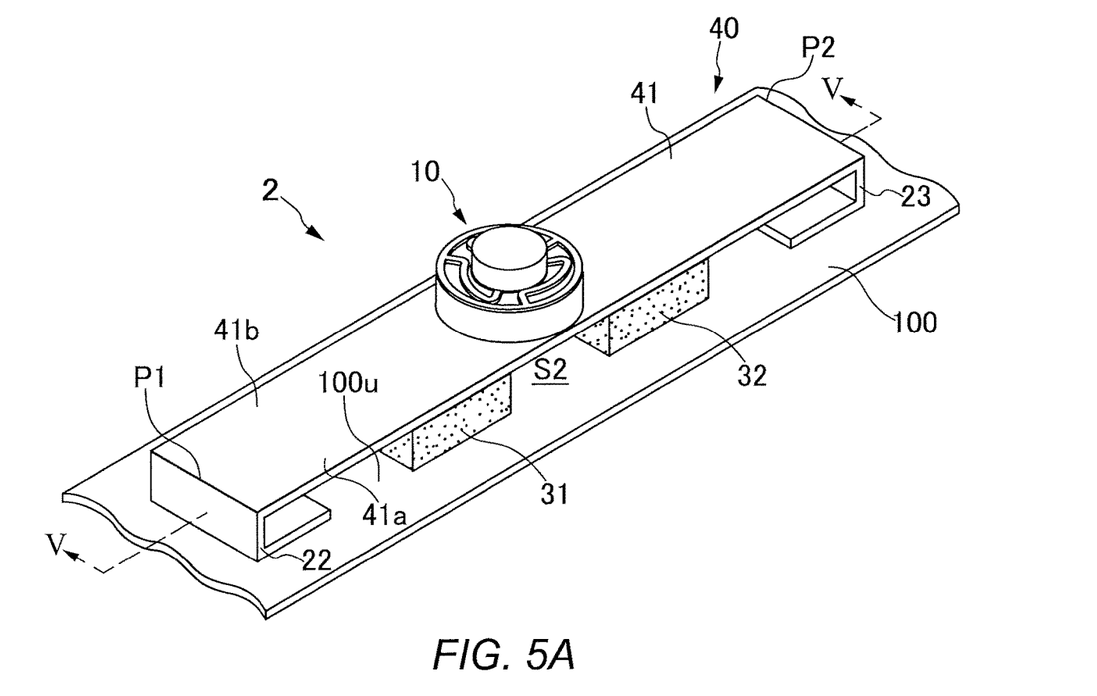
FIG. 5A is a perspective view showing a vibration output apparatus according to a second embodiment.
Figure 5B:
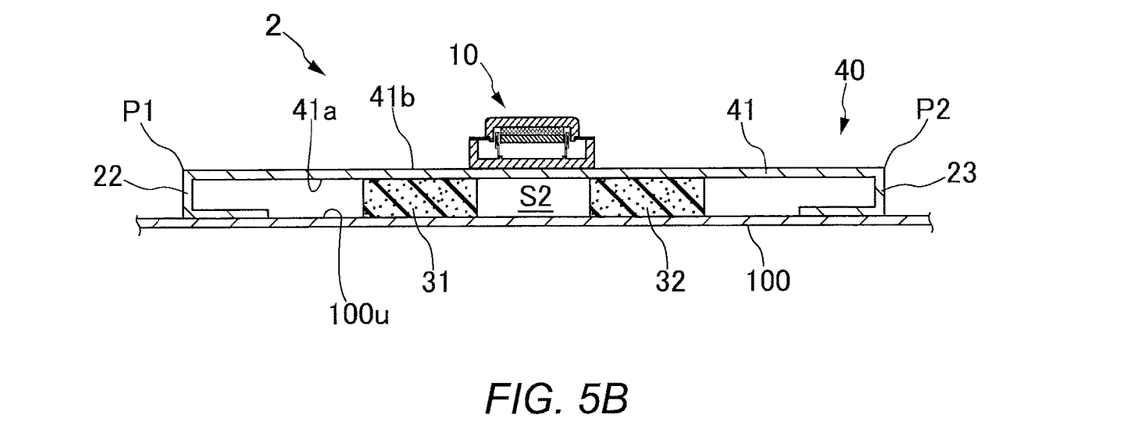
FIG. 5B is a sectional view of the vibration output apparatus taken along cut line V-V in FIG. 5A.

Next, a vibration output apparatus according to a second embodiment will be described. FIG. 5A is a perspective view showing a schematic configuration of a vibration output apparatus 2 according to the second embodiment. FIG. 5B is a sectional view of the vibration output apparatus 2 taken along cut line V-V in FIG. 5A. The vibration output apparatus 2 according to the second embodiment differs from the vibration output apparatus 1 according to the first embodiment in that the dimension in the length direction of a body plate is longer than that of the vibration output apparatus 1 and two cushions are disposed. The same elements as those of the vibration output apparatus 1 according to the first embodiment of the vibration output apparatus 2 according to the second embodiment are given the same reference signs and therefore will not be described in detail.

The vibration output apparatus 2 includes an exciter 10, a vibration transmission member 40, and two cushions 31 and 32. The vibration transmission member 40 includes a body plate 41 having a longer length than the body plate 21 according to the first embodiment and the same first support portion 22 and second support portion 23 as those of the first embodiment. The body plate 41, first support portion 22, and second support portion 23 are formed integrally. The exciter 10 is mounted on the central portion in the length direction of the upper surface 41b of the body plate 41.

The first support portion 22 and second support portion 23 of the vibration transmission member 40 are fixed to a vibration plate 100 using an adhesive. A space S2 is formed between the lower surface 41a of the body plate 41 and the upper surface 100u of the vibration plate 100. Since the body plate 41 has a longer length, the distance from the upper end P1 of the first support portion 22 to the upper end P2 of the second support portion 23 is longer than the distance from the upper end P1 to the upper end P2 according to the first embodiment.

The central portion of the body plate 41 is curved (deformed) alternately in the direction of the upper surface 41b and the direction of the lower surface 41a of the body plate 41, that is, vertically moved using the upper ends P1 and P2 of the first support portion 22 and second support portion 23 as points of support, by an acoustic vibration transmitted from the exciter 10 to the vibration transmission member 40. In this case, the amount of amplitude of the central portion of the body plate 41 located directly below the exciter 10, that is, the deformation width or distortion width of the central portion that is curved alternately in the direction of the upper surface 41b and the direction of the lower surface 41a of the body plate 41 is increased compared to that of the first embodiment. This is because the body plate 41 according to the second embodiment has a longer length than the body plate 21 according to the first embodiment. For this reason, if a single cushion is disposed in the central position of the space S2, that is, in a position in which the amount of amplitude of the body plate 41 is maximized, the single cushion would have difficulty in accepting (absorbing) the amount of amplitude of the body plate 41 by elastic deformation thereof.

It is conceivable that the cushion will be formed of a soft material in order to elastically deform the cushion in a manner corresponding to the amount of amplitude of the body plate 41. However, the cushion formed of a soft material may absorb even low-frequency acoustic vibrations, making it difficult to transmit sufficient low-frequency vibrations to the vibration plate 100.

In the vibration output apparatus 2 according to the second embodiment, as shown in FIGS. 5A and 5B, two (multiple) cushions 31 and 32 are disposed in positions that are displaced from the central portion of the space S2 corresponding to the central portion of the body plate 41 in the direction of the first support portion 22 and the direction of the second support portion 23. Specifically, the two cushions 31 and 32 are disposed, in a well-balanced manner, in positions that, when the central portion of the body plate 41 vertically moves, allow the cushions 31 and 32 to be kept in contact with the lower surface 41a of the body plate 41 and the upper surface 100u of the vibration plate 100.

Thus, the shape (thickness, etc.) of both the cushions 31 and 32 is favorably changed in response to the body plate 41 being curved (deformed). The two cushions 31 and 32 are able to effectively absorb the amount of amplitude of the body plate 41 by elastic deformation thereof and to reduce vibrations and sounds having unwanted frequency components. Thus, it is possible to allow the user to perceive deep, spacious, and extended bass.

The cushions 31 and 32 are disposed on the body plate 41 in a well-balanced manner so that the distances from the cushions 31 and 32 to the exciter 10 are equalized. Such disposition allows for equalizing the amounts of elastic deformation of the cushions 31 and 32 and thus simultaneously deforming the cushions 31 and 32 so as to follow the amount of amplitude of the body plate 41. This allows the cushions 31 and 32 to transmit the same acoustic vibration to the vibration plate 100 at the same timing and thus allows the user to have a feeling of stability (a feeling of unity) with respect to the acoustic vibration.

Since the cushions 31 and 32 are disposed in the positions away from the exciter 10 rather than just below the exciter 10, the cushions can be formed of a material having favorable elastic deformation performance (a material that is not too soft and not too hard). Such cushions 31 and 32 do not excessively absorb low-frequency acoustic vibrations.

To allow the user to have a greater feeling of stability with respect to the acoustic vibration outputted from the vibration plate 100, it is preferred to dispose the two cushions 31 and 32 such that the cushions are point-symmetric with respect to the exciter 10.

In the second embodiment, as in the first embodiment, an end(s) (a contact portion(s)) of one or both of the first support portion 22 and second support portion 23 of the vibration transmission member 40 may be bent inwardly or outwardly. While, in the vibration output apparatus 2 according to the second embodiment, the two cushions 31 and 32 are disposed in the opposite space S2, the number of disposed cushions need not be two and may be three or more.

Third Embodiment

Figure 6A:
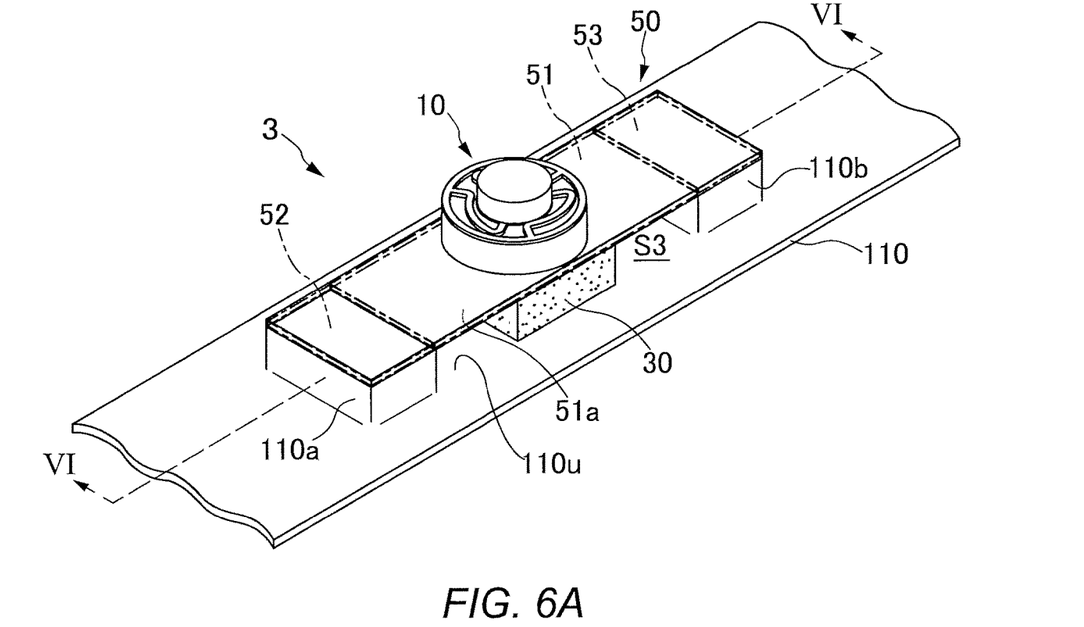
FIG. 6A is a perspective view showing a vibration output apparatus according to a third embodiment.
Figure 6B:
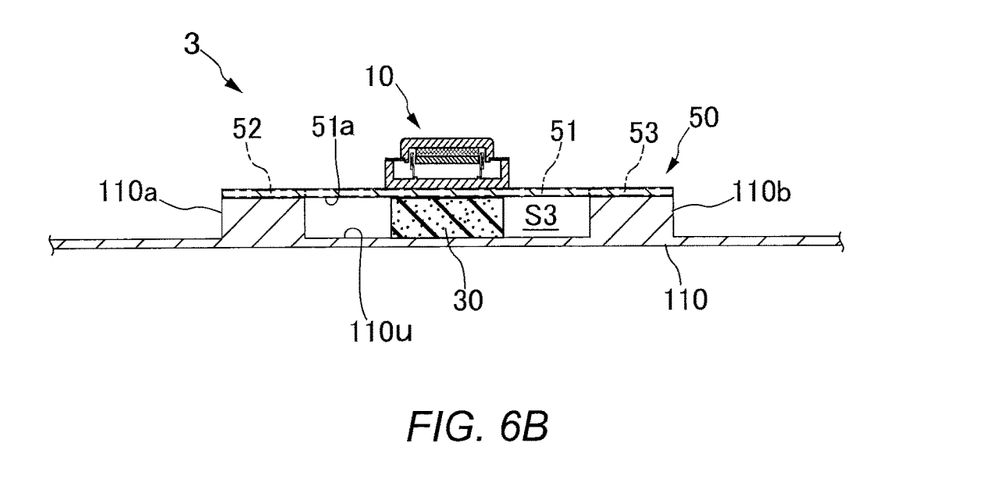
FIG. 6B is a sectional view of the vibration output apparatus taken along cut line VI-VI in FIG. 6A.

Next, a vibration output apparatus 3 according to a third embodiment will be described. In the first and second embodiments, the first support portion 22 and second support portion 23 are formed by bending both ends of the vibration transmission member 20 or 40 at a right angle twice. Thus, the space S1 or S2 is formed between the lower surface 21a or 41a of the body plate 21 or 41 and the upper surface (vibration surface) 100u of the vibration plate 100 so as to correspond to the height dimensions of the first support portion 22 and second support portion 23. However, the first support portion 22 and second support portion 23 do not have to be formed by bending both ends of the vibration transmission member 20 or 40.

FIG. 6A is a perspective view showing a schematic configuration of the vibration output apparatus 3 according to the third embodiment. FIG. 6B is a sectional view of the vibration output apparatus taken along cut line VI-VI in FIG. 6A. The same elements as those of the vibration output apparatus 1 according to the first embodiment or the vibration output apparatus 2 according to the second embodiment of the vibration output apparatus 3 are given the same reference signs and will not be described in detail.

A vibration transmission member 50 of the vehicle transmission member 3 is formed of a tabular elastic metal piece. A vibration plate 110 having the vibration transmission member 50 disposed thereon are provided with protruding portions 110a and 110b. The vibration transmission member 50 is disposed on the vibration plate 110 so as to extend between the protruding portions 110a and 110b and is fixed to the vibration plate 110 using an adhesive.

In the case of the vibration output apparatus 3 according to the third embodiment, both ends of the vibration transmission member 50, which are in contact with the protruding portions 110a and 110b of the vibration plate 110, are referred to as the "first support portion 52" and "second support portion 53." Also, the portion between the first support portion 52 and second support portion 53 of the vibration transmission member 50 is referred to as the "body plate 51." That is, the vibration transmission member 50 is a member in which the first support portion 52, body plate 51, and second support portion 53 are integrated.

The vibration transmission member 50 is extended between the protruding portions 110a and 110b of the vibration plate 110. Thus, a space S3 is formed between the lower surface 51a of the body plate 51 and the upper surface 110u of the vibration plate 110. The cushion 30 is disposed in the central position of the space S3. An acoustic vibration outputted from the exciter 10 is transmitted to the cushion 30 through the body plate 51 of the vibration transmission member 50. The cushion 30 increases the amplitude interval (wavelength) of the inputted acoustic vibration so that the acoustic vibration can be converted into a deep, spacious, and extended low-frequency vibration.

As described above, in the vibration output apparatuses 1, 2, and 3 according to the first to third embodiments, the vibration transmission members 20, 40, and 50 are formed by integrating the body plate 21, 41, or 51 and the support portion 22, 23, 52, or 53. The support portions 22, 23, 52, and 53 are in contact with the vibration plate 100 or 110 and support the body plate 21, 41, or 51. The space S1, S2, and S3 are formed between the body plate 21, 41, or 51 and the vibration plate 100 or 110. The cushions 30, 31, and 32 are disposed in the space S1, S2, or S3. The exciter 10 is disposed in the central position of the upper surface 21b or 41b of the body plate 21, 41, or 51. The spaces (S1, S2, S3, clearances L1 and L2) are formed between the cushion 30, 31, or 32 and the support portion 22, 23, 52, or 53, and any of the support portion 22, 23, 52, and 53 is not in contact with the cushion 30, 31, or 32.

Acoustic vibrations outputted from the exciter 10 of the vibration output apparatus 1, 2, or 3 thus configured are transmitted to the cushion 30, 31, or 32 through the body plate 21, 41, or 51 of the vibration transmission member 20, 40, or 50. The cushion 30, 31, or 32 absorbs and reduces vibrations having frequency components (vibration components) other than low-frequency components, as well as reduces reaction vibrations to be returned from the vibration plate 100 or 110 to the exciter 10. Thus, the vibration output apparatus 1, 2, or 3 is able to convert the acoustic vibrations transmitted to the vibration plate 100 or 110 through the cushion 30, 31, or 32 into deep, spacious, and extended low-frequency vibrations and to output them.

The exciters 10 of the vibration output apparatuses 1, 2, and 3 according to the first to third embodiments are mounted on the body plate 21, 41, or 51 of the vibration transmission member 20, 40, or 50. Also, the body plates 21, 41, and 51 are supported by the support portion 22, 23, 52, or 53 of the vibration transmission member 20, 40, or 50 and thereby fixed to the vibration plate 100 or 110. The cushions 30, 31, and 32 are disposed in the space S1, S2, or S3 between the body plate 21, 41, or 51 and the vibration plate 100 or 110 and therefore the exciter 10 does not have to be supported by the cushion 30, 31, or 32.

Thus, even if the cushion 30, 31, or 32 is formed of a soft material, there is no risk that the exciter 10 will drop from the vibration transmission member 20, 40, or 50. Also, even if the elasticity or shape of the cushion 30, 31, or 32 is changed as the cushion 30, 31, or 32 degrades over time, there is no risk that the exciter 10 will drop.

If the body plates 21, 41, and 51 or the support portions 22, 23, 52, and 53 of the vibration transmission members 20, 40, and 50 are formed of a material having excellent heat dissipation performance, the vibration output apparatuses 1, 2, and 3 according to the first to third embodiments are able to dissipate heat generated by the exciter 10 through the body plate 21, 41, or 51 or support portion 22, 23, 52, or 53. Also, the upper surfaces of the body plates 21, 41, and 51 can be used as heat dissipation surfaces, and the spaces S1, S2, and S3 and the clearances L1 and L2 are secured and formed between the lower surface of the body plate 21, 41, or 51 and the vibration plate 100 or 110 or between the support portions 22, 23, or 52 and the cushion 30, 31, or 32. Thus, the vibration output apparatuses 1, 2, and 3 according to the first to third embodiments are able to effectively dissipate heat.

While the vibration output apparatuses according to the first to third embodiments of the present invention have been described in detail with reference to the drawings, the vibration output apparatus according to the present invention is not limited thereto.

Figure 7:
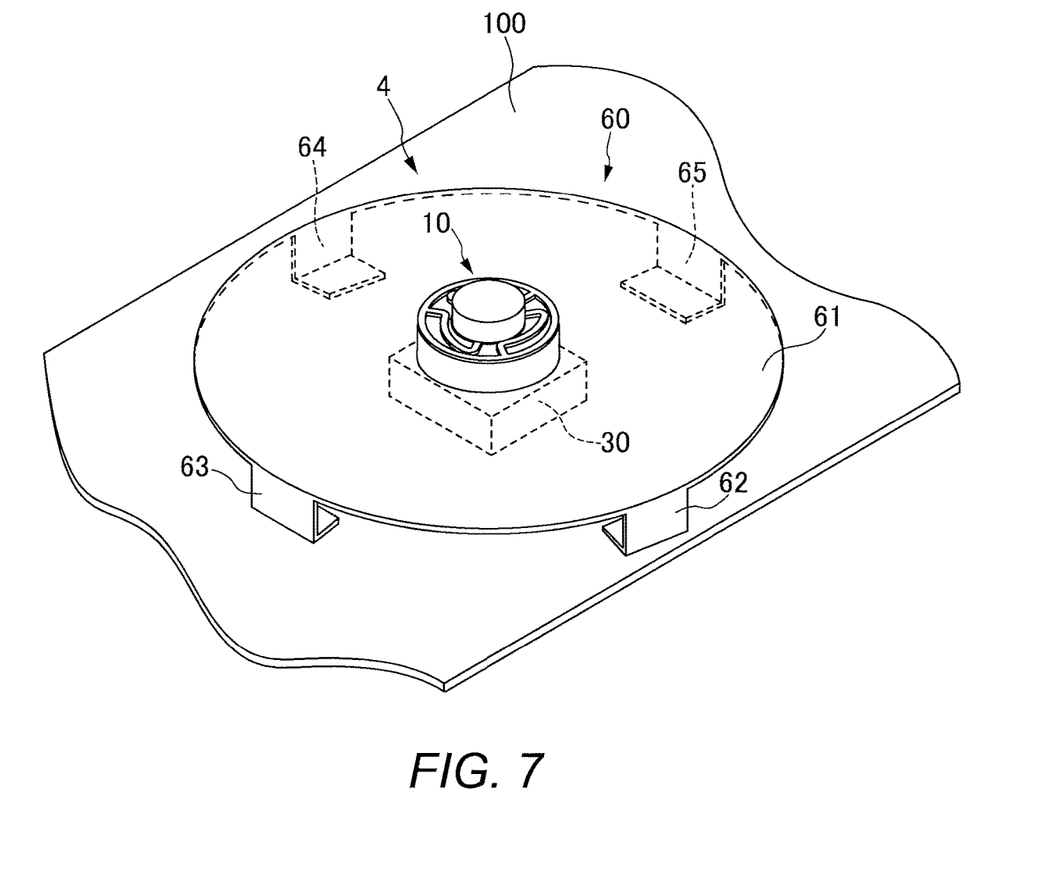
FIG. 7 is a perspective view showing another example configuration of a vibration output apparatus.

For example, in the vibration output apparatuses 1, 2, and 3 according to the first to third embodiments, the body plate 21, 41, and 51 are formed of a tabular metal piece. However, the shape or material of the body plates is not necessarily limited to a tabular shape or metal piece. FIG. 7 is a perspective view showing an example of an vibration output apparatus whose body plate is a circular flat plate. As seen in a vibration output apparatus 4 shown in FIG. 7, a circular flat plate may be used as a body plate 61 of a vibration transmission member 60, and multiple support portions 62, 63, 64, and 65 may be integrally formed on the periphery of the body plate 61. Such a configuration is also able to produce advantageous effects similar to those of the vibration output apparatuses 1 and 2 according to the first and second embodiments. While FIG. 7 shows an example in which the body plate 61 is a circular flat plate, the body plate 61 need not be a circular flat plate and may be an oval flat plate or polygonal flat plate.

Figure 8:
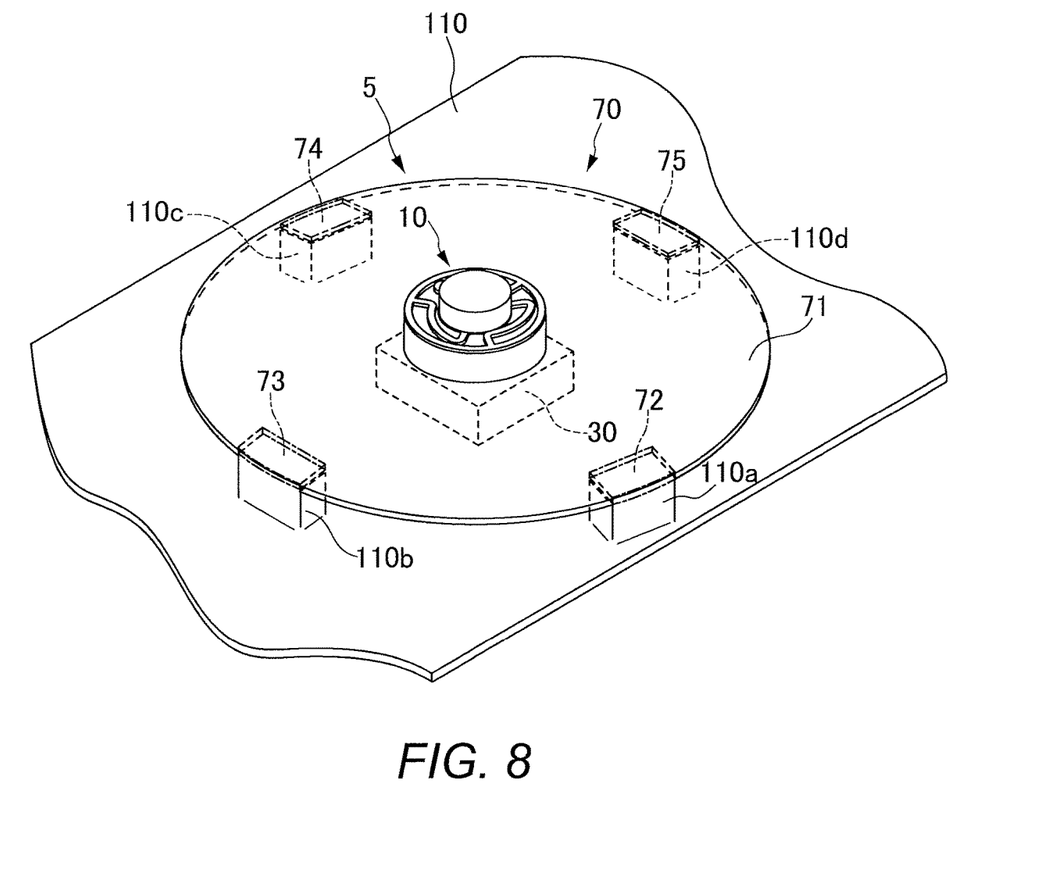
FIG. 8 is a perspective view showing yet another example configuration of a vibration output apparatus.
Figure 9A:
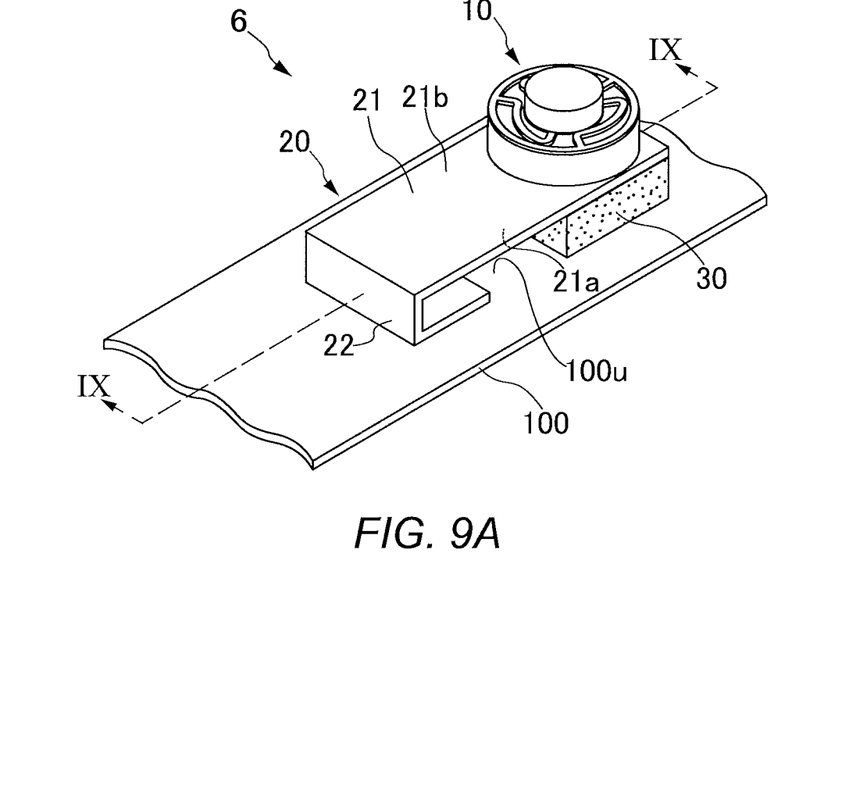
FIG. 9A is a perspective view showing still yet another example configuration of a vibration output apparatus.
Figure 9B:
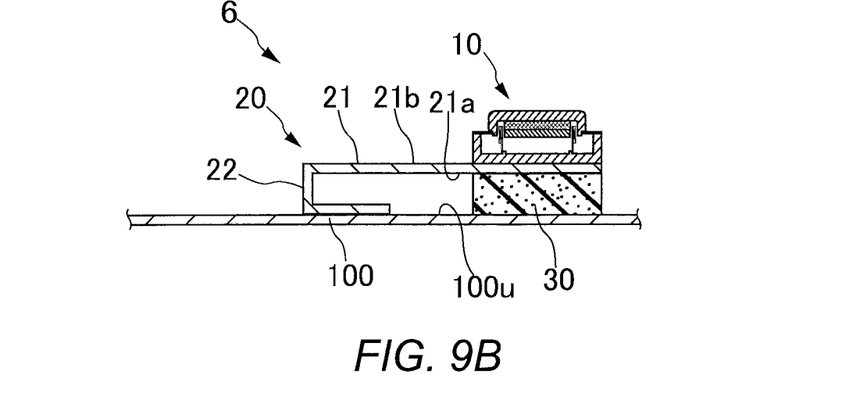
FIG. 9B is a sectional view of the vibration output apparatus taken along cut line IX-IX in FIG. 9A.

FIG. 8 is a perspective view showing an example of a vibration output apparatus in which a vibration transmission member formed by integrating a body plate and support portions is a circular flat plate. In the vibration output apparatus 3 according to the third embodiment, the vibration transmission member 50 formed of a tabular metal piece is fixed to the vibration plate 110 so as to extend between the protruding portions 110a and 110b of the vibration plate 110. On the other hand, in a vibration output apparatus 5 shown in FIG. 8, a vibration transmission member 70 formed of a circular flat plate is disposed on multiple protruding portions 110a, 110b, 110c, and 110d disposed on a vibration plate 110. As in the third embodiment, portions in contact with the protruding portions 110a, 110b, 110c, and 110d of the vibration transmission member 70 are referred to as the "support portions 72, 73, 74, and 75," and a portion thereof on which an exciter 10 is disposed is referred to as the "body plate 71." The vibration output apparatus 5 thus configured is also able to produce advantageous effects similar to those of the vibration output apparatus 3 according to the third embodiment.

While, in the first to third embodiments, the two support portions are disposed, the number of support portions is not limited to two. As shown in FIGS. 7 and 8, three or more support portions may be disposed. Also, as seen in a vibration output apparatus 6 shown in FIG. 9, it is possible to dispose a support portion 22 only on a first end of a body plate 21 and not to dispose a support portion on a second end of the body plate 21.

While, in the first to third embodiments, the support portions 22, 23, 52, and 53 are fixed to the vibration plate 100 or 110 using an adhesive, the method for fixing the support portions 22, 23, 52, or 53 to the vibration plate 100 or 110 is not limited to use of an adhesive. For example, the support portions 22, 23, 52, or 53 may be fixed to the vibration plate 100 or 110 using a screw or fastening member.

The vibration transmission members 20, 40, 50, 60, and 70 may be formed of any material as long as the material is elastic and is able to transmit acoustic vibrations outputted from the exciter 10 to the cushion 30, 31, or 32. For example, the vibration transmission members 20, 40, 50, 60, and 70 may be formed of an engineering plastic or the like.

What is claimed is:

1. A vibration output apparatus comprising:
   a vibration transmission member formed by integrating a body plate and a support portion, the body plate having an opposite surface opposite to a vibration surface of a vibration plate and forming an opposite space between the vibration surface and the opposite surface, the support portion being in contact with the vibration plate and supporting the body plate;
   an acoustic vibration output unit including a frame disposed on a rear surface of the opposite surface of the body plate and configured to output an acoustic vibration by the frame being in contact with the rear surface of the body plate; and
   a cushion disposed in the opposite space so as to be in contact with the vibration surface and the opposite surface,
   wherein the support portion is not in contact with the cushion.

2. The vibration output apparatus according to claim 1, wherein
   the support portion comprises:
      a first support portion formed on a first end of the body plate; and
      a second support portion formed on a second end of the body plate,
   the cushion comprises a plurality of cushions disposed in the opposite space, and
   the cushions are spaced in accordance with a distance from the first support portion to the second support portion.

3. The vibration output apparatus according to claim 1, wherein
   the body plate is formed of an elastic material capable of causing the opposite surface to vibrate in an arc shape using the support portion as a point of support, and
   the cushion is disposed in the opposite space so as to contact a portion serving as an antinode of the vibration of the opposite surface when the body plate vibrates in the arc shape.

4. The vibration output apparatus according to claim 1, wherein
   the body plate is formed of a material having excellent heat dissipation performance, and
   a heat dissipation space is secured between the support portion and the cushion.

5. The vibration output apparatus according to claim 1, wherein
   the support portion is directly fixed to the vibration plate using an adhesive.

6. The vibration output apparatus according to claim 1, wherein
   the body plate and the support portion are a one-piece member.

7. The vibration output apparatus according to claim 1, wherein
   the cushion is directly fixed to both the vibration surface and the opposite surface using an adhesive.

8. The vibration output apparatus according to claim 1, wherein
   the support portion comprises:
      a first support portion formed on a first end of the body plate; and a second support portion formed on a second end of the body plate, and the first support portion and the second support portion each includes a first portion extending from the body plate toward the vibration surface of the vibration plate.

9. The vibration output apparatus according to claim 8, wherein the first support portion and the second support portion each further includes a second portion extending from the first portion toward the opposite space between the vibration surface and the opposite surface.

10. The vibration output apparatus according to claim 9, wherein the cushion is spaced apart from the first support portion and the second support portion.

11. The vibration output apparatus according to claim 9, wherein the cushion comprises a plurality of cushions disposed in the opposite space, and the cushions are spaced in accordance with a distance from the first support portion to the second support portion.

12. The vibration output apparatus according to claim 9, wherein the second portion is directly fixed to the vibration plate using an adhesive.

13. The vibration output apparatus according to claim 8, wherein the first support portion and the second support portion each further includes a second portion extending from the first portion away from the opposite space.

14. The vibration output apparatus according to claim 1, wherein the support portion comprises a first support portion formed on a first end of the body plate, the first support portion includes a first portion extending from the body plate toward the vibration surface of the vibration plate, and the first support portion includes a second portion extending from the first portion toward the opposite space between the vibration surface and the opposite surface.

15. The vibration output apparatus according to claim 14, wherein the cushion is spaced apart from the second portion.

16. The vibration output apparatus according to claim 14, wherein the second portion is directly fixed to the vibration plate using an adhesive.

17. The vibration output apparatus according to claim 1, wherein the support portion comprises multiple support portions formed on a periphery of the body plate, and the multiple support portions each includes a first portion extending from the body plate toward the vibration surface of the vibration plate.

18. The vibration output apparatus according to claim 17, wherein the multiple support portions each further includes a second portion extending from the first portion toward the opposite space between the vibration surface and the opposite surface.

19. The vibration output apparatus according to claim 18, wherein the cushion is spaced apart from the second portion.

20. The vibration output apparatus according to claim 18, wherein the second portion is directly fixed to the vibration plate using an adhesive.

* * * * *